United States Patent
Zhu et al.

(10) Patent No.: US 11,041,944 B2
(45) Date of Patent: Jun. 22, 2021

(54) CONSTANT FALSE ALARM RATE DETECTION IN PULSED LIDAR SYSTEMS

(71) Applicant: Beijing Voyager Technology Co., Ltd., Beijing (CN)

(72) Inventors: Zhenghan Zhu, Mountain View, CA (US); Yue Lu, Mountain View, CA (US); John K. Wu, Mountain View, CA (US); Lingkai Kong, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 127 days.

(21) Appl. No.: 16/290,660

(22) Filed: Mar. 1, 2019

(65) Prior Publication Data

US 2020/0278431 A1    Sep. 3, 2020

(51) Int. Cl.
   *G01S 7/497*    (2006.01)
   *G01S 7/4865*   (2020.01)
   (Continued)

(52) U.S. Cl.
   CPC ............ *G01S 7/497* (2013.01); *G01S 7/4817* (2013.01); *G01S 7/4861* (2013.01);
   (Continued)

(58) Field of Classification Search
   None
   See application file for complete search history.

(56) References Cited

U.S. PATENT DOCUMENTS

| 5,706,013 A | * | 1/1998 | Melvin | ................. G01S 7/2923 |
| | | | | 342/159 |
| 2006/0269027 A1 | * | 11/2006 | Beadle | ................. H04L 7/0054 |
| | | | | 375/354 |

(Continued)

FOREIGN PATENT DOCUMENTS

| EP | 0566705 B1 | * | 5/1996 | ......... G01S 7/52004 |
| TW | 201835603 A | | 1/2018 | |

OTHER PUBLICATIONS

"Detection of a Local Mass Anomaly in the Shallow Subsurface by Applying a Matched Filter" Dipl.-Ing. Tin Lian Abt (Year: 2011).*

(Continued)

*Primary Examiner* — Yuqing Xiao
*Assistant Examiner* — Amir J Askarian
(74) *Attorney, Agent, or Firm* — Kilpatrick Townsend & Stockton LLP

(57) ABSTRACT

Disclosed are techniques for improving the probability of detection and the probability of false alarm of a light detection and ranging (LiDAR) system. A receiver of the LiDAR system is configured to obtain a noise signal vector for an operation condition and determine the coefficients of a matched filter based on the noise signal vector. The matched filter is used to filter a returned signal vector corresponding to returned light detected by the receiver. The receiver detects an object in the field of view of the LiDAR system based on identifying, in the returned signal vector filtered by the matched filter, a pulse having a peak higher than a threshold value. In some embodiments, the receiver is configured to determine the threshold value based on the noise signal vector, energy of the transmitted signal, and a desired false alarm rate.

16 Claims, 10 Drawing Sheets

(51) Int. Cl.
  *G01S 7/4861* (2020.01)
  *G01S 7/481* (2006.01)
  *G01S 17/26* (2020.01)
  *G01S 17/931* (2020.01)

(52) U.S. Cl.
  CPC ............ *G01S 7/4866* (2013.01); *G01S 17/26* (2020.01); *G01S 17/931* (2020.01)

(56) References Cited

U.S. PATENT DOCUMENTS

| | | | |
|---|---|---|---|
| 2015/0109165 A1* | 4/2015 | Holder | G01S 7/2927 342/159 |
| 2017/0242109 A1* | 8/2017 | Dussan | G01S 17/08 |
| 2018/0284277 A1* | 10/2018 | LaChapelle | G01S 7/484 |
| 2018/0313930 A1* | 11/2018 | Chrabieh | H04L 27/2628 |
| 2019/0056497 A1* | 2/2019 | Pacala | G01S 7/4865 |
| 2020/0132850 A1* | 4/2020 | Crouch | G01S 17/32 |
| 2020/0256999 A1* | 8/2020 | Yellepeddi | G01S 7/4873 |

OTHER PUBLICATIONS

"FIR Filter Basics" by Iowegian International (Year: 2019).*
International Search Report and Written Opinion for PCT/IB2020/051738, dated May 28, 2020, 4 pages.

* cited by examiner

CONSTANT FALSE ALARM RATE DETECTION IN PULSED LIDAR SYSTEMS

BACKGROUND

Modern vehicles often include various sensors for detecting objects and landscape features around the vehicle in real-time to enable technologies such as lane change assistance, collision avoidance, and autonomous driving. These sensors may include, for example, optical image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors or laser detection and ranging (LADAR) sensors.

A LiDAR system is an active remote sensing system that uses light beams to detect objects in the ambient environment and determine the distance and/or shape of the objects. A LiDAR system transmits a light beam (e.g., a pulsed laser beam) by a transmitter to illuminate at least a portion of a target and measures the time it takes for the transmitted light beam to arrive at the target and then return to a receiver (e.g., a light detector) near the transmitter or at a known location. In other words, the range of a point on a target to the LiDAR system can be determined based on the time of flight (ToF) of the pulsed light beam from the transmitter to the receiver of the LiDAR system. To measure ranges to multiple points on a target or in a field of view of the LiDAR system, the pulsed light beam is usually scanned in one or two dimensions for two-dimensional or three-dimensional sensing and detection, such as estimating, for example, the distances, dimensions, and locations of objects relative to the LiDAR system.

LiDAR systems used in, for example, autonomous driving or driving assistance, often need to have both a high accuracy and a high sensitivity over a large range and field of view for safety, user experience, and other reasons. For example, LiDAR systems that have both high probability of detection (PD) and low probability of false alarm (PFA) are generally needed in vehicles, such as automobiles and aerial vehicles.

BRIEF SUMMARY

Techniques disclosed herein relate to LiDAR systems. More specifically, and without limitation, disclosed herein are techniques for improving the detection performance of LiDAR systems. Techniques disclosed herein can be used to dynamically determine an optimized matched filter in the receiver of a LiDAR system and dynamically determine appropriate threshold levels for peak detection (and thus object detection) to improve the overall performance of the LiDAR system in both the probability of detection and the probability of false alarm. Various inventive embodiments are described herein, including devices, systems, circuits, methods, non-transitory computer-readable storage media storing programs, code, or instructions executable by one or more processors, and the like.

According to certain embodiments, a LiDAR system may a transmitter configured to transmit light pulses to a field of view of the LiDAR system, and a receiver including a matched filter. The receiver may be configured to generate, in an operation condition of the LiDAR system, a noise signal vector including noise data in the operation condition, a transmitted signal vector corresponding to a light pulse transmitted by the transmitter, and a returned signal vector corresponding to returned light received by the receiver. The returned light may include a portion of a transmitted pulse returned by an object in the ambient environment, ambient light, interferences, or other noises. The receiver may also be configured to determine a covariance matrix of the noise signal vector, determine coefficients of the matched filter based on the transmitted signal vector and the covariance matrix of the noise signal vector, filter the returned signal vector using the matched filter with the determined coefficients, and detect an object in the field of view of the LiDAR system based on identifying, in the returned signal vector filtered by the matched filter, a pulse having a peak higher than a threshold value.

In some embodiments of the LiDAR system, the receiver may be configured to determine the coefficients of the matched filter by determining an inverse matrix of the covariance matrix, computing a product of the inverse matrix and the transmitted signal vector, and assigning values in the product to the coefficients of the matched filter. In some embodiments, the receiver may be configured to determine the coefficients of the matched filter by determining a whitening matrix based on the covariance matrix, calculating a product of the whitening matrix and the transmitted signal vector, and assigning values in the product to the coefficients of the matched filter.

In some embodiments of the LiDAR system, the receiver may be further configured to determine, based on a first time corresponding to a location of the identified pulse in the returned signal vector and a second time when the light pulse is transmitted by the LiDAR system, a distance between the LiDAR system and the detected object. In some embodiments, the receiver may be further configured to determine a noise power of the noise data based on the noise signal vector, determine a transmitted signal energy of the light pulse transmitted by the transmitter based on the transmitted signal vector, and determine the threshold value based on a constant false alarm rate (CFAR), the noise power of the noise data, and the transmitted signal energy. In some embodiments, the receiver may be configured to determine the threshold value by computing a square root of a product of the noise power of the noise data and the transmitted signal energy, determining an inverse Q function of the CFAR, and determining, as the threshold value, a product of the square root and the inverse Q function of the CFAR.

In some embodiments, the receiver may be further configured to determine a bias of the noise data based on the noise signal vector and remove the bias from the returned signal vector, where the receiver may be configured to filter the returned signal vector by convolving the coefficients of the matched filter and the returned signal vector with the bias removed. In some embodiments, receiver may be configured to generate the noise signal vector in a time window before receiving the returned light. In some embodiments, the noise data may include interference data. In some embodiments, the matched filter may include a discrete-time finite impulse response filter.

According to certain embodiments, a method may include generating, by a receiver of a light detection and ranging (LiDAR) system under an operation condition, a noise signal vector including noise data under the operation condition, a transmitted signal vector corresponding to a light pulse transmitted by the LiDAR system to a field of view of the LiDAR system, and a returned signal vector corresponding to returned light detected by the LiDAR system. The method may also include determining a covariance matrix of the noise signal vector, determining coefficients of a matched filter based on the transmitted signal vector and the covariance matrix of the noise signal vector, filtering the returned signal vector using the matched filter with the determined coefficients, and detecting an object in the field of view of the LiDAR system based on identifying, in the returned signal vector filtered by the matched filter, a pulse having a peak higher than a threshold value. In some embodiments, determining the coefficients of the matched filter may include determining a whitening matrix based on the covariance matrix, calculating a product of the whitening matrix and the transmitted signal vector, and assigning values in the product to the coefficients of the matched filter.

In some embodiments, the method may also include determining, based on a first time corresponding to a location of the identified pulse in the returned signal vector and a second time when the light pulse is transmitted by the LiDAR system, a distance between the LiDAR system and the detected object. In some embodiments, the method may also include determining a noise power of the noise data based on the noise signal vector, determining a transmitted signal energy of the light pulse transmitted by the LiDAR system based on the transmitted signal vector, and determining the threshold value based on a constant false alarm rate (CFAR), the noise power of the noise data, and the transmitted signal energy. In some embodiments, determining the threshold value may include computing a square root of a product of the noise power of the noise data and the transmitted signal energy, determining an inverse Q function of the CFAR, and determining, as the threshold value, a product of the square root and the inverse Q function of the CFAR.

According to certain embodiments, a receiver for a LiDAR system may include a noise parameter extraction unit configured to receive a noise signal vector including noise data in an operation condition of the LiDAR system, and determine a covariance matrix of the noise signal vector. The receiver may also include a matched filter configured to receive a returned signal vector corresponding to returned light received by the LiDAR system and filter the returned signal vector. The receiver may further include a matched filter coefficient determination unit configured to receive a transmitted signal vector corresponding to a light pulse transmitted by the LiDAR system, and determine coefficients of the matched filter based on the transmitted signal vector and the covariance matrix of the noise signal vector. The receiver may include an object detection unit configured to detect an object in a field of view of the LiDAR system based on identifying, in the returned signal vector filtered by the matched filter, a pulse having a peak higher than a threshold value.

In some embodiments, the matched filter coefficient determination unit may be configured to determine the coefficients of the matched filter by determining a whitening matrix based on the covariance matrix, calculating a product of the whitening matrix and the transmitted signal vector, and assigning values in the product to the coefficients of the matched filter. In some embodiments, the object detection unit may be further configured to determine, based on a first time corresponding to a location of the identified pulse in the returned signal vector and a second time when the light pulse is transmitted by the LiDAR system, a distance between the LiDAR system and the detected object.

In some embodiments, the receiver may also include a threshold determination unit configured to determine a noise power of the noise data based on the noise signal vector, determine a transmitted signal energy of the light pulse transmitted by the LiDAR system based on the transmitted signal vector, and determine the threshold value based on a constant false alarm rate (CFAR), the noise power of the noise data, and the transmitted signal energy. In some embodiments, the threshold determination unit may be configured to determine the threshold value by computing a square root of a product of the noise power of the noise data and the transmitted signal energy, determining an inverse Q function of the CFAR, and determining, as the threshold value, a product of the square root and the inverse Q function of the CFAR.

Techniques disclosed herein may offer various improvements and advantages over existing techniques. By filtering the digitized detection signal of the photodetector using a matched filter that is dynamically determined based on the operation condition and the transmitted signal, and detecting peaks of pulses using a threshold that is also dynamically determined based on the operation condition, the desired possibility of false alarm, and the transmitted signal energy, a high probability of detection and a low constant false alarm rate can be achieved. Therefore, for a LiDAR system having a receiver subsystem that employs techniques disclosed herein, the probability of false alarm can be maintained constant at a low level (e.g., $<1 \times 10^{-6}$) under different operation conditions (e.g., daytime, night, hot or cold weather, etc.) due to the real-time learning of the noise/interference properties, the real-time matched filter updates, and the real-time threshold determination.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

DETAILED DESCRIPTION

Figure 1:
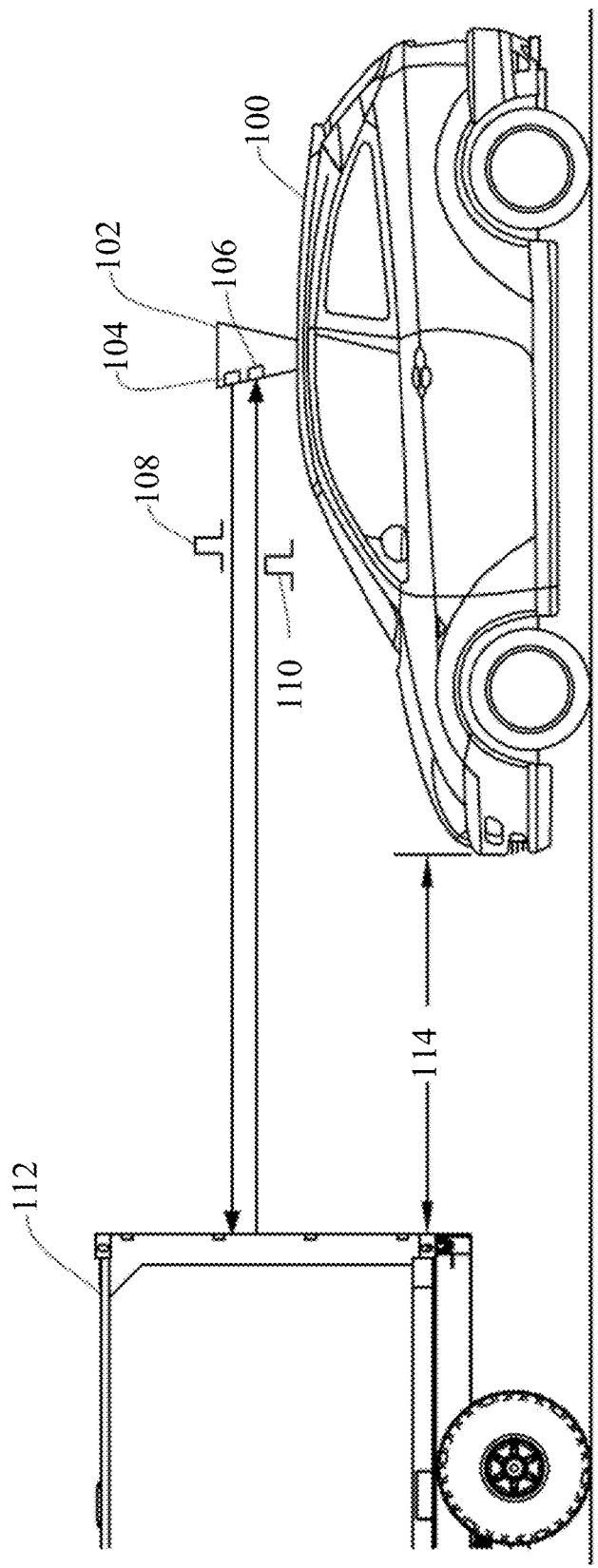
FIG. 1 illustrates an example of a vehicle including a LiDAR-based detection system according to certain embodiments.

Techniques disclosed herein relate generally to light detection and ranging (LiDAR) or laser detection and ranging (LADAR) systems, and more specifically, to techniques for improving the detection performance of receivers of LiDAR systems to achieve a low constant false alarm rate (CFAR) while achieving a high probability of detection (PD). Various inventive embodiments are described herein, including devices, systems, circuits, methods, non-transitory computer-readable storage media storing programs, code, or instructions executable by one or more processors, and the like.

A LiDAR system may use a transmitter subsystem that transmits pulsed light beams (e.g., infrared light beam), and a receiver subsystem that receives the returned pulsed light beam and detects objects (e.g., people, animals, and automobiles) and environmental features (e.g., trees and building structures). A LiDAR system carried by a vehicle (e.g., an automobile or an unmanned aerial vehicle) may be used to determine the vehicle's relative position, speed, and direction with respect to other objects or environmental features, and thus may, in some cases, be used for autonomous driving, auto-piloting, driving assistance, parking assistance, collision avoidance, and the like. It is often challenging to detect objects over a large distance range (e.g., 200-500 m) with high fidelity (e.g., within 5 cm or less) using a limited number of receivers and under all operation conditions (e.g., during day and night, with rain or snow, and in hot or cold weather). For example, in many operation conditions, it may be difficult for a LiDAR system to maintain both a high accuracy (e.g., a low probability of false alarm (PFA)) and a high sensitivity (e.g., a high probability of detection (PD)), and thus a trade-off may often need to be made between the PD and PFA.

According to certain embodiments, a LiDAR receiver subsystem may include an improved matched filter, where the coefficients of the matched filter may be determined in real time based on a transformed reference waveform, rather than the reference waveform (e.g., the transmitted signal) itself. In some embodiments, the reference waveform is transformed (e.g., whitened) using a covariance matrix (or a whitening matrix) that is dynamically determined based on noise and interference data collected in real time under the operation condition. In addition, in some embodiments, the peak-detection threshold used for identifying the peaks of pulses (and thus target objects) in a received waveform may be dynamically determined based on a maximum allowable false alarm rate, the noise power under the operation condition, and the energy of the transmitted signal. By filtering the digitized detection signal of the LiDAR receiver subsystem using a matched filter that is dynamically determined based on the operation condition and the transmitted signal, and detecting peaks of pulses using a threshold that is also dynamically determined based on the operation condition, the desired possibility of false alarm, and the transmitted signal energy, a high probability of detection and a low constant false alarm rate can be achieved.

Therefore, for a LiDAR system having a receiver subsystem that employs techniques disclosed herein, the probability of false alarm can be maintained constant at a low level (e.g., $<1\times10^{-6}$) under different operation conditions (e.g., daytime, night, hot or cold weather, etc.) due to the real-time learning of the noise/interference properties, the real-time matched filter updates, and the real-time threshold determination.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

A LiDAR system (or a LADAR system) is an active remote sensing system that can be used to obtain the range from a transmitter to one or more points on a target in a field of view. A LiDAR system uses a light beam, typically a laser beam, to illuminate the one or more points on the target. Compared with other light sources, a laser beam may propagate over long distances without spreading significantly (highly collimated), and can be focused to small spots so as to deliver high optical power densities and provide fine resolution. The laser beam may be modulated such that the transmitted laser beam includes a series of pulses. The transmitted laser beam may be directed to a point on the target, which may reflect or scatter the transmitted laser beam. The laser beam reflected or scattered from the point on the target to the LiDAR system can be measured, and the time of flight (ToF) from the time a pulse of the transmitted light beam is transmitted from the transmitter to the time the pulse arrives at a receiver near the transmitter or at a known location may be measured. The range from the transmitter to the point on the target may then be determined by, for example, r=c×t/2, where r is the range from the transmitter to the point on the target, c is the speed of light in free space, and t is the ToF of the pulse of the light beam from the transmitter to the receiver.

A LiDAR system may include a single-point scanning system or a single-pulse flash system. A single-point scanning system may use a scanner to direct a pulsed light beam (e.g., pulsed laser beam) to a single point in the field of view at a time and measure the reflected or backscattered light beam with a photodetector. The scanner may then slightly tilt the pulsed light beam to illuminate the next point, and the process may be repeated to scan the full field of view. A flash LiDAR system, on the other hand, may transmit a wider-spread light beam and use a two dimensional array of photodiodes (e.g., a focal-plane array (FPA)) to measure the reflected or backscattered light at several points simultaneously. Due to the wider beam spread, a flash LiDAR system may scan a field of view faster than a single-point scanning system, but may need a much more powerful light source to illuminate a larger area.

FIG. 1 illustrates an example of a vehicle 100 including a LiDAR-based detection system according to certain embodiments. Vehicle 100 may include a LiDAR system 102. LiDAR system 102 may allow vehicle 100 to perform object detection and ranging in the surrounding environment. Based on the result of the object detection and ranging, vehicle 100 may, for example, automatically maneuver (with little or no human intervention) to avoid a collision with an object in the environment. LiDAR system 102 may include a transmitter 104 and a receiver 106. Transmitter 104 may direct one or more light pulses 108 at various directions at different times according to a suitable scanning pattern, while receiver 106 may detect returned light pulses 110 which may be portions of transmitted light pulses 108 that are reflected or scattered by one or more areas on one or more objects. LiDAR system 102 may detect the object based on the detected light pulses 110, and may also determine a range (e.g., a distance) of each area on the detected objects based on a time difference between the transmission of a light pulse 108 and the reception of a corresponding light pulse 110, which is referred to as the time of flight. Each area on a detected object may be represented by a data point that is associated with a 2-D or 3-D direction and distance with respect to LiDAR system 102.

The above-described operations can be repeated rapidly for many different directions. For example, the light pulses can be scanned using various scanning mechanisms (e.g., spinning mirrors or MEMS devices) according to a one-dimensional or two-dimensional scan pattern for two-dimensional or three-dimensional detection and ranging. The collection of the data points in the 2-D or 3-D space may form a "point cloud," which may indicate, for example, the direction, distance, shape, and dimensions of a detected object relative to the LiDAR system.

In the example shown in FIG. 1, LiDAR system 102 may transmit light pulse 108 in a direction directly in front of vehicle 100 at time T1 and receive a returned light pulse 110 that is reflected by an object 112 (e.g., another vehicle) at time T2. Based on the detection of light pulse 110, LiDAR system 102 may determine that object 112 is directly in front of vehicle 100. In addition, based on the time difference between T1 and T2, LiDAR system 102 may determine a distance 114 between vehicle 100 and object 112. LiDAR system 102 may also determine other useful information, such as a relative speed and/or acceleration between two vehicles and/or the dimensions of the detected object (e.g., the width or height of the object), based on additional light pulses detected. As such, vehicle 100 may be able to adjust its speed (e.g., slowing down, accelerating, or stopping) to avoid collision with other objects, or may be able to control other systems (e.g., adaptive cruise control, emergency brake assist, anti-lock braking systems, or the like) based on the detection and ranging of objects by LiDAR system 102.

Figure 2:
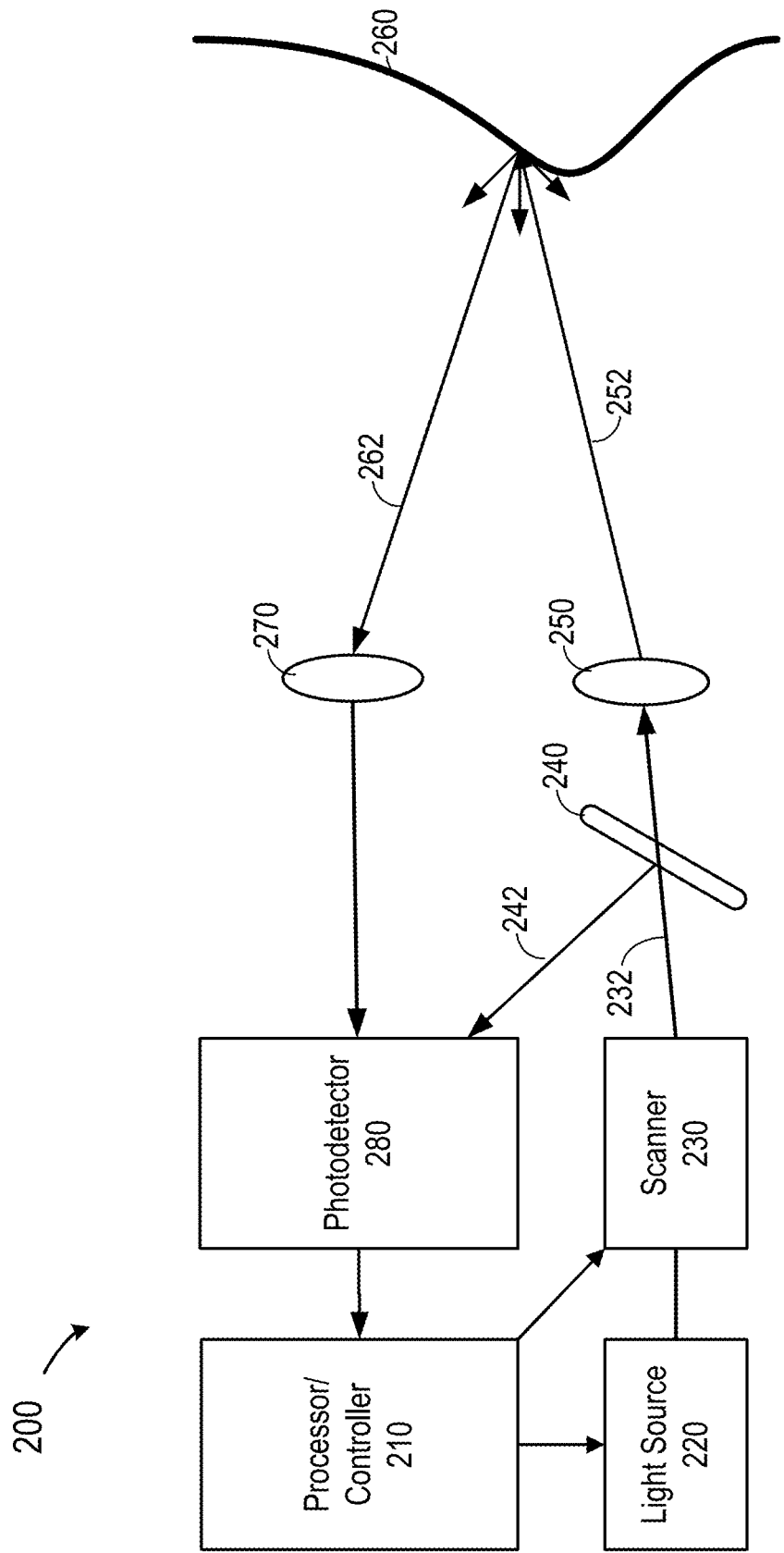
FIG. 2 is simplified block diagram of an example of a LiDAR system according to certain embodiments.

FIG. 2 is simplified block diagram of an example of a LiDAR system 200 according to certain embodiments. LiDAR system 200 may include a transmitter that may include a processor/controller 210, a light source 220, a scanner 230 for scanning an output light beam from light source 220, and a transmitter lens 250. Light source 220 may include, for example, a laser, a laser diode, a vertical cavity surface-emitting laser (VCSEL), a light-emitting diode (LED), or other optical sources. The laser may include, for example, an infrared pulsed fiber laser or other mode-locked laser with an output wavelength of, for example, 930-960 nm, 1030-1070 nm, around 1550 nm, or longer. Processor/controller 210 may control light source 220 to transmit light pulses. Scanner 230 may include, for example, a rotating platform driven by a motor, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, a resonant fiber scanner, or an acoustic actuator. In one example, LiDAR system 200 may include a single-point scanning system that uses a micro-electro-mechanical system (MEMS) combined with a mirror to reflect a pulsed light beam to a single point in the field of view. In some embodiments, scanner 230 may not include a mechanically moving component, and may use, for example, a phased array technique where phases of an array of light beams (e.g., from lasers in a one-dimensional (1-D) or two-dimensional (2-D) laser array) may be modulated to alter the wavefront of the superimposed light beam. Transmitter lens 250 may direct a light beam 232 towards a target 260 as shown by light beam 252.

LiDAR system 200 may include a receiver that may include a receiver lens 270, a photodetector 280, and processor/controller 210. Reflected or scattered light beam 262 from target 260 may be collected by receiver lens 270 and directed to photodetector 280. Photodetector 280 may include a detector having a working (sensitive) wavelength comparable with the wavelength of light source 220. Photodetector 280 may be a high speed photodetector, such as a PIN photodiode with an intrinsic region between a p-type semiconductor region and an n-type semiconductor region, a silicon photomultiplier (SiPM) sensor, or an InGaAs avalanche photodetector (APD). Processor/controller 210 may be used to synchronize and control the operations of light source 220, scanner 230, and photodetector 280, and analyze measurement results based on the control signals for light source 220 and scanner 230, and the signals detected by photodetector 280.

In some embodiments, a beam splitter 240 may split light beam 232 from scanner 230 and direct a portion of light beam 232 towards photodetector 280 as shown by light beam 242 in FIG. 2. Light beam 242 may be directed to photodetector 280 by beam splitter 240 directly or indirectly through one or more mirrors. In some embodiments, the light beam from the light source may be split and directed to the receiver before entering scanner 230. By partially directing the transmitted pulses near the transmission source to photodetector 280, the directed pulses captured by photodetector 280 immediately after transmission can be used as the transmitted pulses or reference pulses for determining the time of flight. This technique can be used to capture the transmitted pulses on the same channel as the returned pulses. The time window in which a transmitted pulse is expected to arrive may be referred to as the transmission window, while the time window in which a light pulse returned from a target is expected to arrive may be referred to as a receive (or backscatter) window. To measure the time of flight, approximate positions of transmitted and returned pulses must be identified within the waveform of the detection signal of photodetector 280. A LiDAR system may use, for example, a leading-edge detector, a peak detector, or a matched-filter detector, to recover transmitted and/or returned light pulses in the detection signal from the photodetector.

The strength or signal level of the returned light pulses may be affected by many factors, including, but not limited to, the transmitted signal strength, object reflectivity, attenuation in the propagation medium, system front end gain, and the like. The noise floor may be affected by, for example, the ambient light level and front end gain settings. Generally, in a same system, the signal-to-noise ratio (SNR) of the measured signal may decrease with the increase in the distance of detection. Thus, it may be easier to detect objects at a closer range (e.g., within about 20 m) because the signal levels of the returned light pulses may be high compared with the ambient noise level, and thus the SNR of the detection signal of photodetector 280 can be relatively high. On the other hand, pulse signals returned from long ranges (e.g., about 200 m) may be significantly weaker and thus may have signal strength levels similar to the ambient noise level (i.e., a low SNR). As such, setting a peak-detection threshold too high may reduce the chance of detecting returned pulse signals, thus reducing the probability of detection of objects in long ranges. Conversely, setting the peak-detection threshold too low may result in false positive detections and increase the false alarm rate because the noises (e.g., spurious noises) may trigger a false object detection.

In some embodiments, to improve the SNR of the received pulse signals, the receiver of a LiDAR system may include a matched filter. A matched filter may use the transmitted pulse signal as a reference and may use cross-correlation techniques to recover the returned pulse from the detection signal, where the maximum correlation value may represent the peak of the recovered pulse and the spurious tones (e.g., pulses with shorter durations) may be suppressed or removed. In some cases, such as in long-range detection, the noise and interference may be relatively high compared with the strength of the returned pulse, and thus merely using the transmitted pulse to determine the coefficients of the matched filter may not be sufficient for recovering the returned pulses.

According to certain embodiments, a LiDAR system may include an improved receiver that includes an improved matched filter, the coefficients of which is determined in real time based on a reference signal that includes a transformed (e.g., whitened) transmitted signal, rather than the transmitted signal itself. In some embodiments, the transmitted signal is transformed (e.g., whitened) using a covariance matrix or a whitening matrix that is dynamically determined based on noise and interference data collected in real time under the operation condition. In addition, in some embodiments, the peak-detection threshold used for identifying peaks (and thus target objects) in a detection signal corresponding to the returned light (which may include light pulse(s) retuned from target object(s), ambient light, interference light, or the like) may be dynamically determined based on a maximum allowable false alarm rate, noise properties of the operation condition (e.g., the noise power in the operation environment), and the energy level of the transmitted pulse signal. By filtering the received signal using a matched filter that is dynamically determined based on the operation condition, and detecting peaks using a threshold that is also dynamically determined based on the operation condition, both a high probability of detection and a low constant false alarm rate can be achieved.

Figure 3:
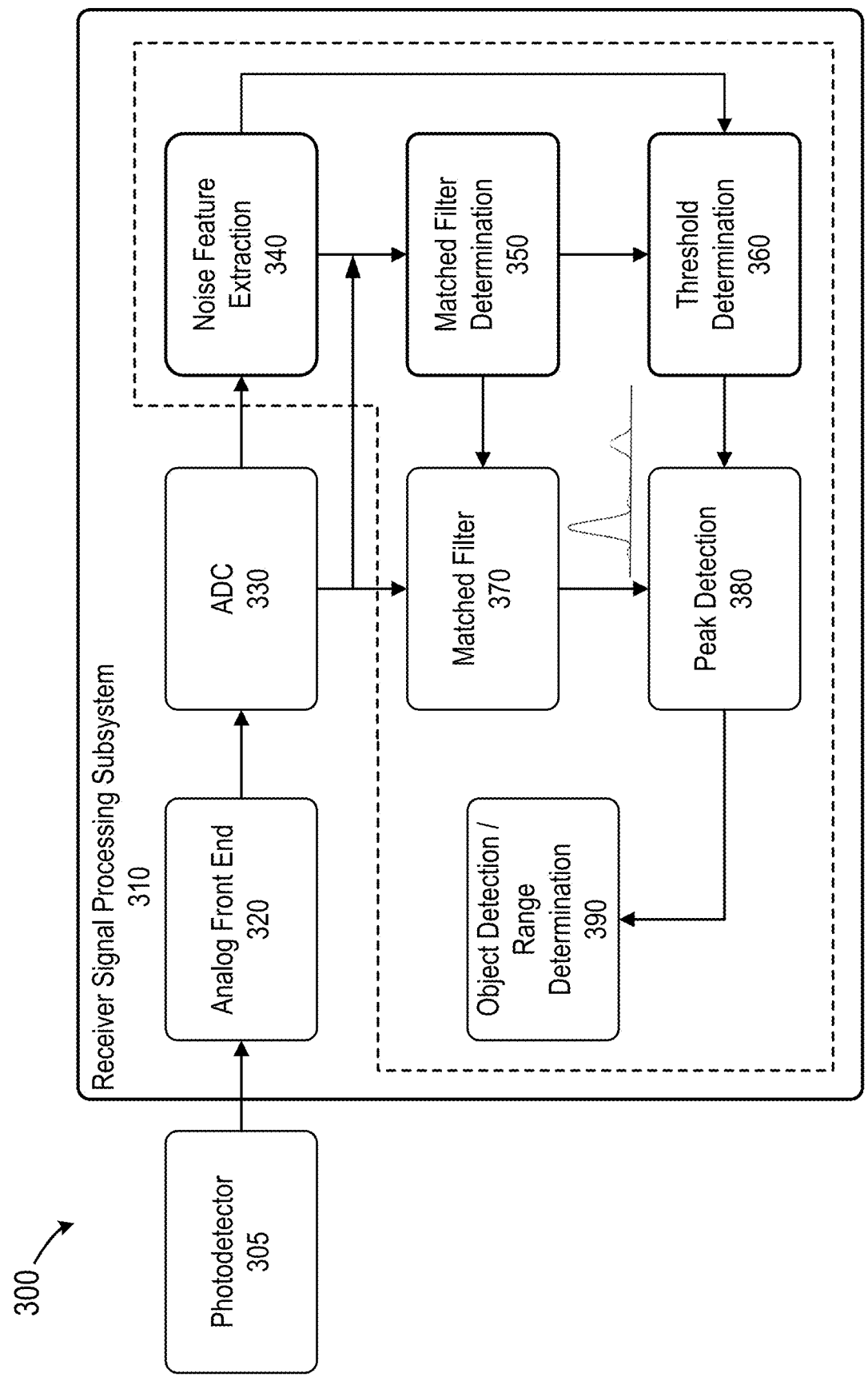
FIG. 3 is a simplified block diagram of an example of a receiver of a LiDAR system according to certain embodiments.

FIG. 3 is a simplified block diagram of an example of a receiver 300 of a LiDAR system according to certain embodiments. Receiver 300 may include a photodetector 305 and a receiver signal processing subsystem 310. Photodetector 305 may be similar to photodetector 280 of FIG. 2, and may measure returned light pulses from targets (e.g., light beam 262), and, in some implementations, a portion of the transmitted light pulses (e.g., light beam 242). As described above, photodetector 305 may be any suitable high-speed detector that can detect light pulses in the working wavelength of the LiDAR system, such as a PIN photodiode, a silicon photomultiplier sensor, or an InGaAs avalanche photodetector. Photodetector 305 may generate a detection signal in response to receiving light in its working wavelength range. In some embodiments, the returned light pulses and portions of the transmitted light pulses may be detected by different photodetectors or different elements of a same photodetector array. In some embodiments, the returned light pulses and portions of the transmitted light pulses may be detected by the same photodetector. The detection signal from photodetector 305 may include pulses corresponding to the returned and/or transmitted light pulses, and various types of noises from the environment or generated by photodetector 305 or other components of the LiDAR system.

Receiver signal processing subsystem 310 may include an analog front end (AFE) circuit 320, an analog-to-digital converter (ADC) 330, and a digital signal processing circuit (indicated by the dashed line, which may be implemented using a special-purpose processing circuit or a general-purpose processor). AFE circuit 320 may be used to condition the analog detection signal, such as amplifying and filtering the detection signal. For example, in some embodiments, AFE circuit 320 may include a low-noise amplifier (LNA) (e.g., a low-noise transimpedance amplifier) and/or a variable gain amplifier (e.g., a programmable gain amplifier) for amplifying the detection signal. In some embodiments, AFE circuit 320 may include a filter, such as a band-pass filter or a high-pass filter, for selecting signal band of interest and rejecting some noises. ADC 330 may convert the analog detection signals to digital signals for digital signal processing. ADC 330 may include a high speed ADC having a high input bandwidth in order to convert the short pulses with low distortion and nonlinearity.

The digital signal processing circuit may include a special-purpose processing circuit or a general-purpose processor, such as one or more CPUs, microcontrollers (MCUs), digital signal processors (DSPs), ASICs, programmable logic devices, or the like, with supporting hardware (e.g., memory), firmware, and/or software, as would be appreciated by one of ordinary skill in the art. In the example shown in FIG. 3, the digital signal processing circuit may include a noise feature extraction unit 340 for extracting noise and interference properties from the digitized detection signals of photodetector 305, a matched filter determination unit 350 for dynamically determining the coefficients of the matched filter, and a threshold determination unit 360 for dynamically determining the peak-detection threshold. The digital signal processing circuit may also include a matched filter 370 that can apply the matched filter coefficients determined by matched filter determination unit 350 to filter the digitized detection signal and recover pulse signals corresponding to the returned light pulses. The digital signal processing circuit may further include a peak detection unit 380 that can use the peak-detection threshold determined by threshold determination unit 360 to identify pulse signals corresponding to the returned light pulses in the output of matched filter 370. Based on the identified pulse signals in the digitized and filtered detection signal, an object detection/range determination unit 390 may then detect objects in the environment and determine the distances, shapes, and locations of the detected objects.

In a LiDAR system, the returned or backscattered light pulse is generally an altered version of the transmitted pulse. In some LiDAR systems, a matched filter may perform cross-correlation between the received signal and a reference waveform model to recover a returned pulse, where the maximum correlation value may represent the peak of the recovered pulse. The performance of the matched filter may depend on the accuracy of the reference waveform model. The returned or backscattered light pulse is generally a distorted version of the transmitted pulse (due to the non-linearity of the reflection and scattering properties of the target and the transmission properties of the light propagation medium (e.g., the air), and noises and interferences from the operation environment. The width and shape of the transmitted pulse or returned pulse may also differ for different LiDAR systems and may dependent on the laser transmitter and optical receiver used. Therefore, the exact shape of each returned pulse to be recovered may not always be known.

Figure 4:
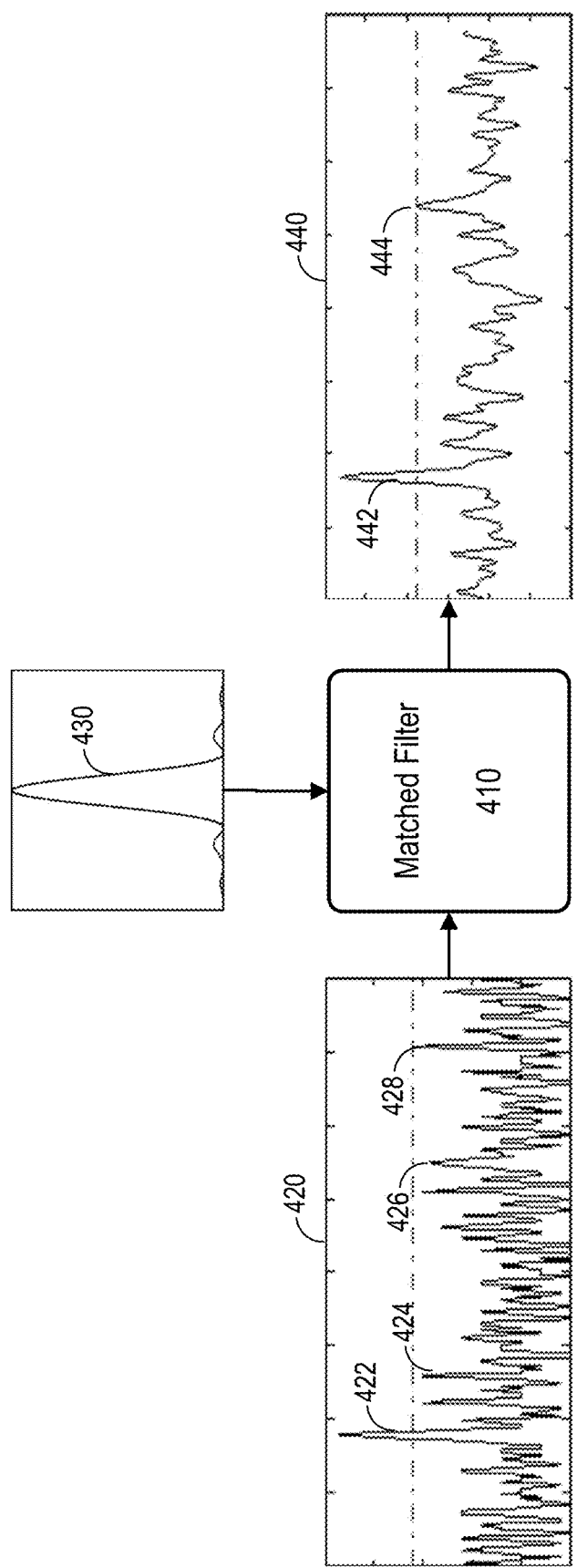
FIG. 4 illustrates an example of LiDAR detection signal filtering using a matched filter according to certain embodiments.

FIG. 4 illustrates an example of LiDAR detection signal filtering using a matched filter 410 according to certain embodiments. As described above, matched filtering is a pulse processing technique used to reduce noise and recover a specific shape from an input signal (or sequence). A matched filter may compare an input signal with a reference signal to determine the similarity between them. Matched filtering can be implemented by calculating the cross-correlation of the input signal with a shifted reference signal (or model) to produce an output sequence that includes a correlation value corresponding to each reference signal shift according to:

$$y[n] = \sum_{k=-\infty}^{+\infty} x[k]r[k-n], n = 0, \pm 1, \pm 2 \tag{1}$$

where x[k] is the input signal, y[n] is the output signal, r[k] is the reference signal, and n represents the time shift between the input signal and the reference signal. This is equivalent to convolving the input signal with a conjugated time-reversed version of the reference signal. In some embodiments, the matched filter may be implemented using a discrete-time finite impulse response (FIR) filter by setting the order of the FIR filter to the length of the reference waveform, and setting the coefficients of the matched filter to the values of the samples of the reference signal in reversed order, where the output of the matched filter may be determined by:

$$y[n] = \sum_{i=0}^{N} h_i x[n-i] = x[n] * h[n], \tag{2}$$

where $h_i$(i=0, 1, 2, ..., N) is the matched filter coefficient and N is the order of the matched filter. In some embodiments, the FIR filter can be implemented in real-time using digital components, such as using D flip-flops or other registers to store previous input samples, using parallel multipliers to multiply each sample and the corresponding filter coefficient, and using an adder tree to sum the products.

As shown in the example in FIG. 4, the coefficients of matched filter 410 may be determined based on a reference signal 430. A noisy input waveform 420 that includes multiple peak signals 422, 424, 426, 428, and the like, may be filtered by matched filter 410 to generate a filtered signal 440. The matched filtering may be performed by the convolution of noisy input waveform 420 (e.g., represented by a first vector) and a matched filter function (e.g., represented by a second vector corresponding to the matched filter coefficients, which may correspond to values of a vector representing reference signal 430) as described above with respect to equation (2). Filtered signal 440 may be a smooth output waveform, where some of the peak signals (e.g., peak signals 424 and 428, which may be spurious tones that have short durations, rather than a returned pulse) in the noisy input waveform 420 may be suppressed or removed. Filtered signal 440 may include a pulse 442, which may correspond to, for example, a transmitted pulse. Filtered signal 440 may also include a pulse 444, which may correspond to a returned pulse. Based on the distance between pulse 442 and pulse 444 in the time domain (i.e., the ToF), a distance in space between the LiDAR system and a target object may be determined.

Matched filtering can recover the location of a pulse in the LiDAR data that best matches the reference signal based on the index of highest correlation. The ability of a matched filter to accurately determine the location of the returned pulse may depend on the accuracy of the reference signal. If the reference signal does not match the returned pulse well, the highest correlation may not occur at the corrected index, and thus the matched filter may not be accurate. In some embodiments, the width and shape of a reference signal used in matched filtering may be modeled from the general shape of typical returned pulses. Various reference signal models may be used to describe the returned pulse of a LiDAR system, such as an inverse Parabola, Gaussian, or Poisson function. However, components of a LiDAR system (e.g., the transmitter and the receiver), object reflectivity, range, light propagation medium, and the like, may affect the actual shape of the returned pulse. As a result, determining an accurate reference signal may be very difficult.

According to certain embodiments, the reference signal for the matched filter used in the receiver of a LiDAR system may be determined based on the transmitted pulse (e.g., the measured transmitted pulse) and the noise (including interference) properties of the system (including the effect of the environment). In some embodiments, before or during a portion of the transmission window of a measurement when no returned pulse is received by the photodetector of the receiver, a detection signal that only includes the noise data may be collected. Noise feature extraction unit 340 may analyze the noise-only detection signal to determine the noise properties of the system, including a covariance matrix or a whitening matrix of the noise data. The transmitted pulse (e.g., measured from a portion of the transmitted light pulse) may be transformed by matched filter determination unit 350 using the covariance matrix (or the whitening matrix) to determine a corrected or calibrated reference signal for matched filtering. During the receive window, the returned light pulse may be measured by the photodetector, and the generated detection signal (after signal conditioning and digitization) may include a pulse corresponding to the returned light pulse and noises. The detection signal may be filtered by matched filter 370 to recover the pulse, where the coefficients of matched filter 370 are determined by matched filter determination unit 350 as described above.

Peak detection unit 380 may identify a peak that may correspond to a returned pulse from the output of matched filter 370 based on a peak-detection threshold. As described above, setting the peak-detection threshold too high may reduce the chance of detecting returned pulses, thus reducing the probability of detection of objects in, for example, long ranges. Conversely, setting the peak-detection threshold too low may result in false positive detections and increase the false alarm rate because the noises (e.g., spurious noises) may trigger a false object detection. As the operation condition of the LiDAR changes, the noises in the detection signal may change as well. Thus, the levels of the noises (including interferences) in the output of the matched filter may also change with the operation condition. As such, the peak-detection threshold may need to be changed with the change of the operation condition.

According to certain embodiments, threshold determination unit 360 may dynamically determine the peak-detection threshold based on the desired false alarm rate, the noise and interference properties extracted from the digitized noise signals by noise feature extraction unit 340, and the energy of the transmitted pulse. Thus, peak detection unit 380 may use the dynamically determined peak-detection threshold to identify peaks in the output of matched filter 370 that may correspond to returned (or transmitted) pulses.

Object detection/range determination unit 390 may detect objects in the environment and determine the distances, shapes, and locations of the detected objects, based on the pulses in the output of matched filter 370 detected by peak detection unit 380. For example, based on the time difference between a transmitted pulse and the corresponding returned pulse, the time of flight of the pulse may be determined and thus the distance between a target point in the corresponding light beam scanning direction and the LiDAR system can be determined based on the light speed in the light propagation medium (e.g., the air) and the time of flight.

The above-described operations can be performed for each scanning direction, each transmitted pulse, or each time period. For example, in some embodiments, for each measurement (e.g., each target point), the noise feature extraction, matched filter determination, and peak-detection threshold determination may be performed before or during a portion of the transmission window, during which no transmitted pulse may be returned and received by the photodetector (e.g., photodetector 280 or 305) and thus the measured signal may only include noise and/or interference information. In some embodiments, the signal measured during the transmission window may include a portion of the transmitted pulse, which can be separated and used to determine the matched filter coefficients, and the remaining data may be used to extract the noise properties of the operation condition. In some embodiments, the noise feature extraction, matched filter determination, and threshold determination operations may not be performed for every target point or every transmitted pulse, and may instead be performed once for multiple measurements or multiple target points, or may be performed once during each predetermined time period (e.g., 10 µs, 100 µs, 1 ms, or longer). During the receive window of each measurement, photodetector 305 may measure the returned pulse and generate a detection signal that may also include noise and interference data. The detection signal may be processed by analog front end circuit 320, ADC 330, matched filter 370, peak detection unit 380, and object detection/range determination unit 390 to detect an object and/or measure a distance between the LiDAR system and a target point.

Figure 5:
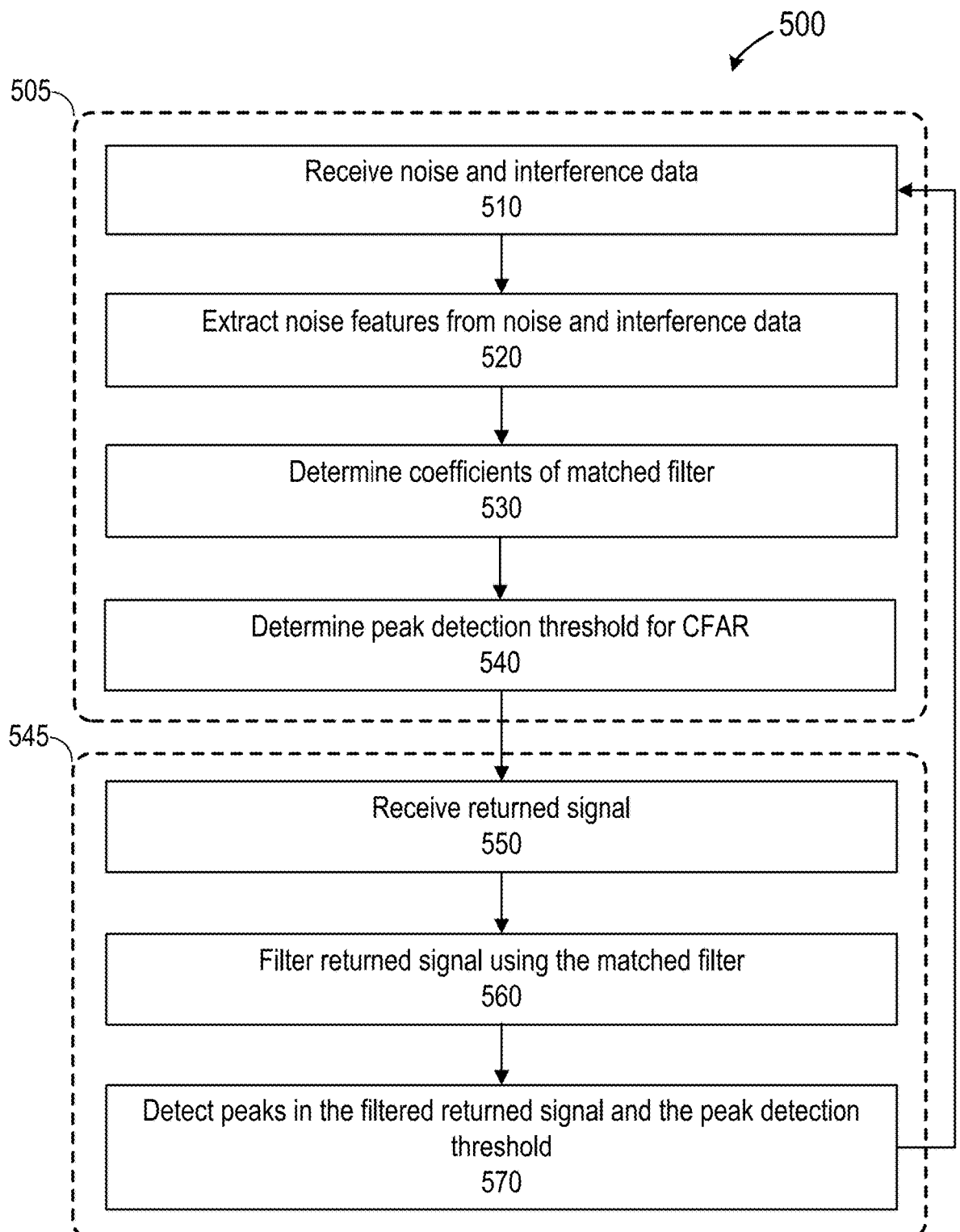
FIG. 5 is a flow chart illustrating an example of a process performed by a receiver of a LiDAR system to detect objects of interest according to certain embodiments.

FIG. 5 is a flow chart 500 illustrating an example of a process performed by a receiver of a LiDAR system to detect objects of interest according to certain embodiments. Flow chart 500 may include operations 505 performed before a receive window (e.g., before or during a transmission window) and operations 545 performed during a receive window. As described above, in some embodiments, operations 505 may be performed for each target point or each transmitted pulse. In some embodiments, operations 505 may be performed once for multiple target points, multiple transmitted pulses, or a predetermined time window.

At block 510, the receiver of the LiDAR system, more specifically, the digital signal processing circuit of the receiver, may receive noise and interference data X including x[n] (n=0 to N). As described above, the noise and interference data may be received from a photodetector during a portion of the processing time of a transmitted pulse, such as before or during the transmission window, and may be processed by an analog front end circuit (e.g., AFE circuit 320) and then converted to digital data by an analogto-digital converter (e.g., ADC 330). if the noise and interference data is received during the transmission window, the transmitted pulse included in the received detection signal may be separated or removed from the received detection signal. The noise and interference data may include white noises, spurs, interference tones, or other noises of the operation environment, including the noises caused by the LiDAR system itself (e.g., the transmitter and/or the receiver), the target object, the light propagation medium, and other objects or light sources in the operation environment. It is noted that the noise and interference data may or may not include interference noises under different operation conditions.

At block 520, the receiver of the LiDAR system may extract noise features from the noise and interference data X. Noise features extracted from the noise and interference data X may include, for example, the bias and the noise power of the noises. In some embodiments, a covariance matrix of the noise and interference data X may be determined. In some embodiments, the operations at block 520 may be performed by noise feature extraction unit 340 described above.

Figure 6:
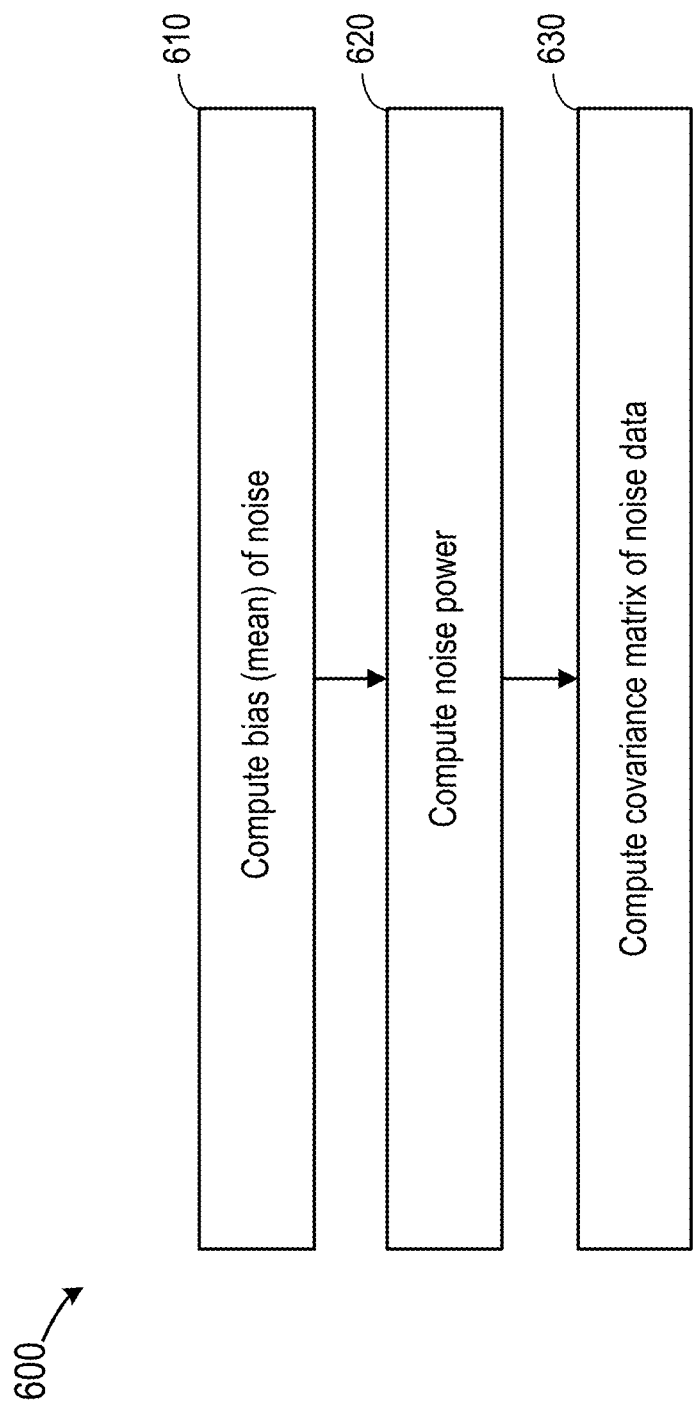
FIG. 6 is a simplified flow chart illustrating an example of a process of extracting noise features from real-time noise data for real-time operation condition calibration according to certain embodiments.

FIG. 6 is a simplified flow chart 600 illustrating an example of a process of extracting noise features from real-time noise data for real-time operation condition calibration according to certain embodiments. Operations in flow chart 600 may include some examples of the operations at block 520, and may be performed by, for example, a noise feature extraction unit, such as noise feature extraction unit 340. At block 610, the noise feature extraction unit may compute a bias µ of the noise and interference data (e.g., X). In some embodiments, the bias µ may be computed by calculating the mean or average of the digitized noise and interference data:

$$\mu = \frac{1}{N+1} \sum_{i=0}^{N} x[i]. \tag{3}$$

At block 620, the noise feature extraction unit may compute the noise power Pn of the noise and interference data. For example, the noise feature extraction unit may subtract the bias from the noise and interference data and then compute the variance of the resultant data (i.e., the noise and interference data shifted by an amount equal to the bias). Thus, noise power Pn may be determined according to:

$$Pn = \sum_{i=0}^{N} (x[i] - \mu)^2. \tag{4}$$

At block 630, the noise feature extraction unit may calculate a covariance matrix of the noise and interference data. In some embodiments, the noise feature extraction unit may perform spectral analysis on the noise and interference data and then perform an inverse fast Fourier transform (IFFT) to compute the covariance matrix of the noise and interference data, which can be used to determine a whitening matrix (e.g., by inversing the covariance matrix).

In one example, the noise and interference data may be represented by a column vector $X_T$ including x[l] for l=1 to L, and the order of the desired matched filter is N. For each set $X_k$ in the noise and interference data (i.e., column vector $X_T$) that includes N samples, a covariance matrix may be determined as:

$$C_k = E(X_k \times X_k^T), \tag{5}$$

where the covariance matrix $C_k$ is an N×N matrix. If L>N, multiple covariance matrices $C_k$ may be calculated based on different sets of $X_k$ in the noise and interference data (i.e., column vector $X_T$), where the sets may be selected from column vector $X_T$ by, for example, using a sliding window and a step size of one or more. Different covariance matrices may be used to determine the matched filter coefficients used at different time instants.

In some embodiments, the noise feature extraction unit may directly calculate in the time domain a whitening matrix that can transform a random vector to a vector of the same dimension and with a diagonal covariance matrix. For example, if X is a random column vector with a non-singular covariance matrix $C=E(X \times X^T)$ and a mean value 0, and a transformation Y=W×X satisfying the condition $W^T \times W = C^{-1}$ yields a whitened random vector Y with a unit diagonal covariance matrix $C'=E(Y \times Y^T)=I$, W (which is a square matrix) is a whitening matrix that can be used to de-correlate input data. There can be many different possible whitening matrices that can convert a random vector into a vector of the same dimension with a diagonal covariance matrix. For example, whitening matrix W can be $C^{-1/2}$ (which may be referred to as zero-phase component analysis (ZCA)-Mahalanobis whitening) or the Cholesky decomposition of $C^{-1}$ (which may be referred to as Cholesky whitening).

Referring back to FIG. 5, at block 530, the receiver of the LiDAR system may determine the coefficients of a matched filter. As described above, a matched filter may be determined based on a reference signal. For example, the coefficients of a matched filter can be set to the values of the samples of the reference signal in reversed order: h[i]=r[N−i], where the reference signal may be determined based on the transmitted signal. However, due to the nonlinearity of the measurement environment, the actual returned signal may be a distorted version of the transmitted signal and thus using a transmitted signal vector S as the reference signal (i.e., the estimated returned signal) for determining the coefficients of the matched filter (e.g., h[i]=s[N−i]) may not be sufficiently accurate for the desired performance. Thus, in some embodiments, the receiver of the LiDAR system may transform the transmitted signal using the covariance matrix (or the whitening matrix) determined at block 630 (e.g., equation (5)) to determine a corrected reference signal for matched filtering.

Figure 7:
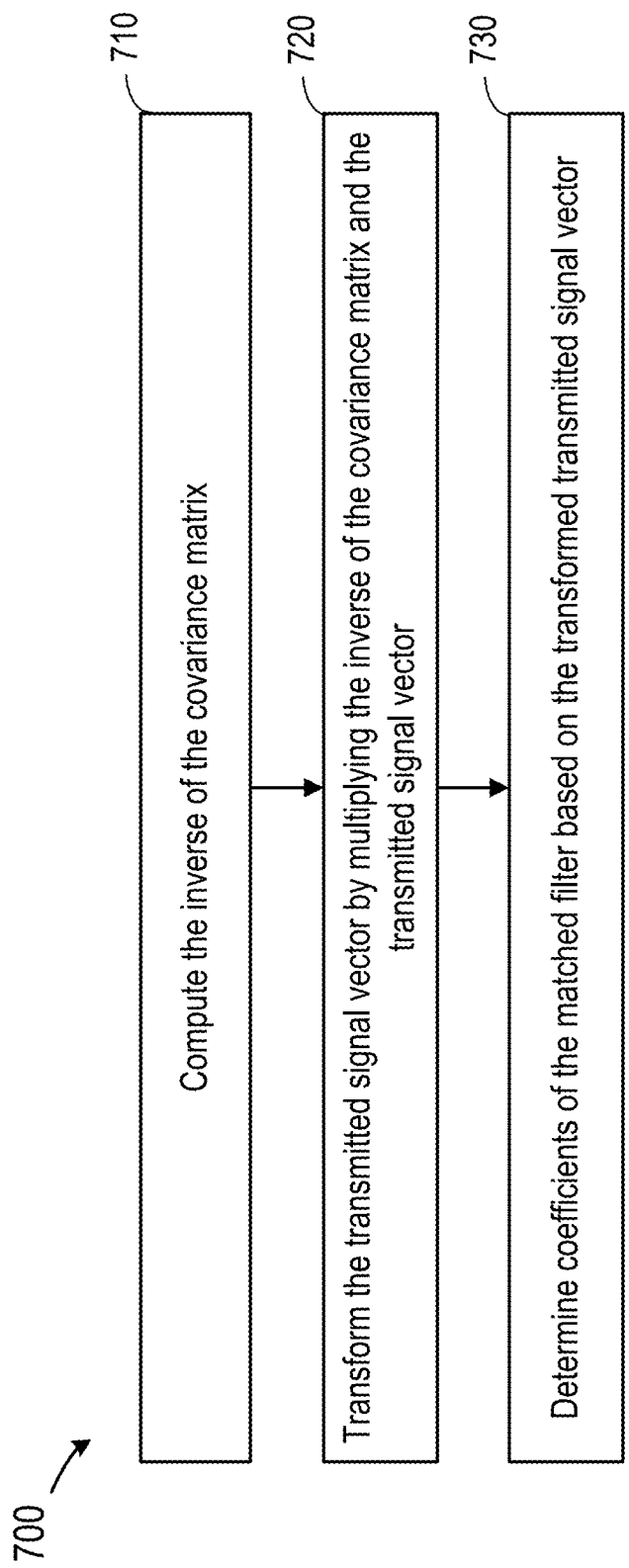
FIG. 7 is a simplified flow chart illustrating an example of a process of generating a matched filter that is updated in real time for filtering measured signals according to certain embodiments.

FIG. 7 is a simplified flow chart 700 illustrating an example of a process of generating a matched filter that is updated in real time for filtering measured signals according to certain embodiments. Operations in flow chart 700 may include some examples of the operations at block 530, and may be performed by, for example, a matched filter determination unit, such as matched filter determination unit 350 in receiver signal processing subsystem 310 of receiver 300. At block 710, the matched filter determination unit may compute the inverse covariance matrix $C^{-1}$ of the covariance matrix $C \in \mathbb{R}^{N \times N}$ determined at block 520 or block 630. At block 720, the matched filter determination unit may transform a transmitted signal vector using the inverse covariance matrix $C^{-1}$. For example, the matched filter determination unit may multiply the inverse covariance matrix $C^{-1}$ and a transmitted signal vector $S \in \mathbb{R}^{N \times 1}$ to determine the matched filter coefficients $S' \in \mathbb{R}^{N \times 1}$.

$$S' = C^{-1} \times S, \tag{5}$$

where transmitted signal vector S may be determined based on, for example, the transmitted signal measured during the transmission window as described above. In some embodiments, a whitening matrix as described above, instead of the inverse covariance matrix $C^{-1}$, may be used for transforming (e.g., whitening or de-correlating) the transmitted signal vector. At block 730, the matched filter determination unit may determine the coefficients of the matched filter based on the transformed transmitted signal vector as described above. For example, coefficients of the matched filter can be set to the values of the elements in the transformed transmitted signal vector S' in reversed order: $h[i]=s'[N-i]$ for $i=0$ to N.

Referring back to FIG. 5, at block 540, the receiver may determine a peak-detection threshold for pulse detection in order to achieve a constant false alarm rate. For example, the peak-detection threshold may be dynamically determined based on a maximum allowed probability of false alarm PFA, the transmitted signal energy, and the noise power determined from the noise and interference data.

Figure 8:
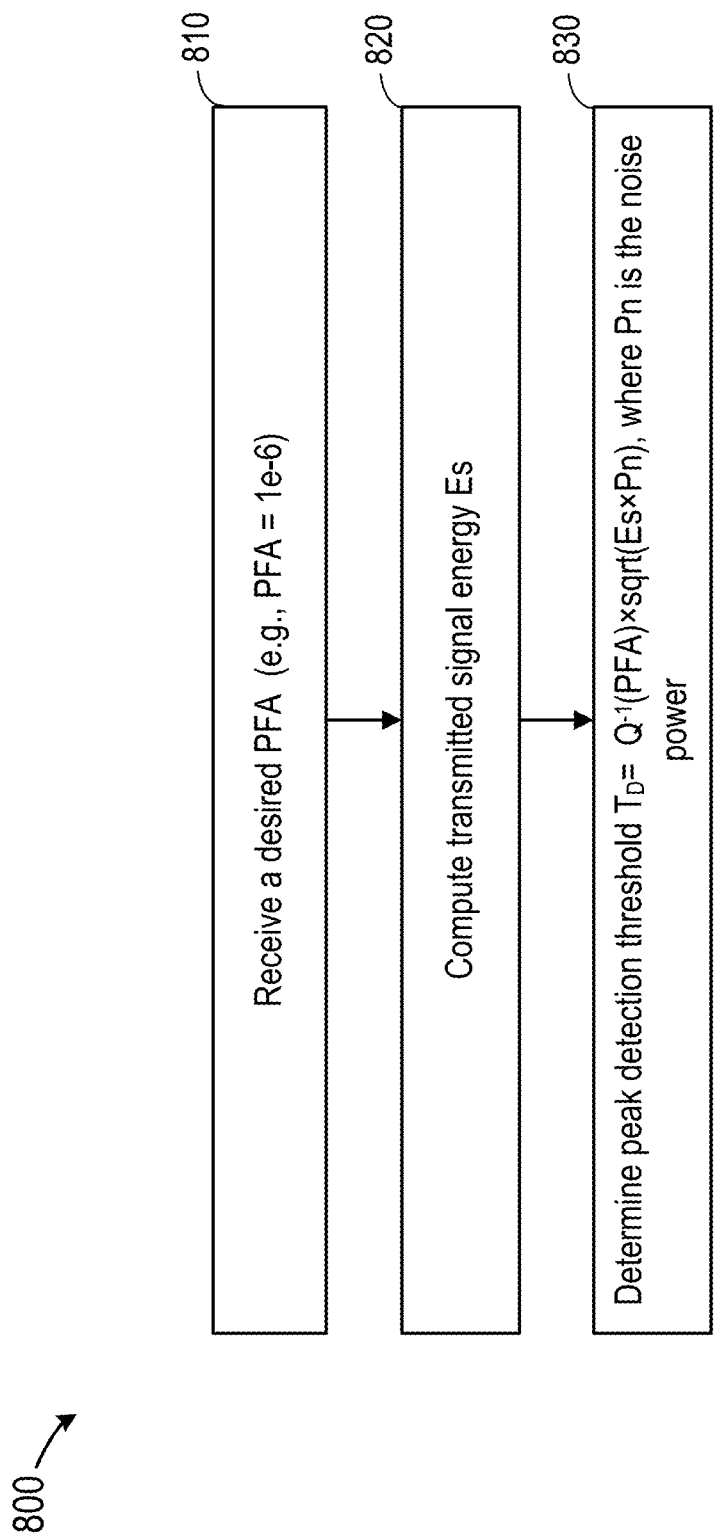
FIG. 8 is a simplified flow chart illustrating an example of a process of dynamically determining a peak-detection threshold for detecting pulses with peaks higher than the peak-detection threshold according to certain embodiments.

FIG. 8 is a simplified flow chart 800 illustrating an example of a process of dynamically determining a peak-detection threshold for detecting pulses with peaks higher than the peak-detection threshold according to certain embodiments. Operations in flow chart 800 may include some examples of the operations at block 540, and may be performed by, for example, a threshold determination unit, such as threshold determination unit 360 in receiver signal processing subsystem 310 of receiver 300. At block 810, the threshold determination unit may receive or determine a desired probability of false alarm PFA based on the system specification. For example, the desired probability of false alarm PFA may be set to, for example, $1 \times 10^{-5}$, $1 \times 10^{-6}$, or lower. At block 820, the threshold determination unit may compute the transmitted signal energy. In some embodiments, the transmitted signal energy may be calculated as $E_s = S^T \times S$, where transmitted signal vector S is a column vector. In some embodiments, the transmitted signal energy may be calculated as $E_s = S^T \times S'$, where S' is the transformed transmitted signal vector described above. At block 830, the threshold determination unit may determine the peak-detection threshold based on the desire probability of false alarm PFA, the transmitted signal energy, and the noise power determined from the noise and interference data. In one example, the peak-detection threshold may be determined as:

$$T_D = Q^{-1}(PFA) \times \text{sqrt}(Es \times Pn), \quad (6)$$

where $Q^{-1}$ is the inverse Q-function determined by, for example:

$$Q^{-1}(x) = \sqrt{2} \text{erf}^{-1}(1-2x) = \sqrt{2} \text{erfc}^{-1}(2x), \quad (7)$$

and Pn is the noise power determined based on the noise and interference data.

Referring back to FIG. 5, at block 550, the receiver, more specifically, the digital signal processing circuit of the receiver, may receive a returned signal detected during a receive window. The returned signal may include a digitized column vector Z.

At block 560, the receiver, more specifically, the matched filter of the receiver (e.g., matched filter 370) may filter column vector Z according to, for example:

$$Y = \text{filter}(Z - \mu, S'), \quad (8)$$

where Y is the output vector of the matched filter, filter( ) may be a matched filtering function as described above, μ is the bias of the noise and interference data described above with respect to, for example, block 610, and S' is the transformed transmitted signal vector determined at block 720. As described above, the matched filtering can be performed by calculating the cross-correlation between the input signal and the reference signal (e.g., transformed transmitted signal vector S'), which may be implemented using a discrete-time finite impulse response (FIR) filter the coefficients of which may be set to the values of the samples of transformed transmitted signal vector S' in reversed order.

At block 570, the receiver, more specifically, the peak detection unit in the receiver (e.g., peak detection unit 380) may detect a pulse in the output of the matched filter that has a peak higher than the peak-detection threshold determined by threshold determination unit 360 to identify a returned pulse, which, if detected, may correspond to a target point on a detected object in the field of view of the LiDAR system. For example, the peak detection unit may search the peaks in the output vector Y of the matched filter for peaks that have amplitudes higher than peak-detection threshold $T_D$ for the desire PFA (i.e., the CFAR). If no pulse having a peak higher than peak-detection threshold $T_D$ is detected in a returned signal, no object may be detected in the working range of the LiDAR system. Based on the time difference between a transmitted pulse and the detected pulse in the corresponding returned signal, the time of flight of the pulse may be determined and thus the distance between the target point in the corresponding light beam scanning direction and the LiDAR system can be determined.

As described above, in some embodiments, the above-described operations in blocks 510-570 can be performed for each scanning direction, each transmitted pulse, or each pre-determined time period. For example, in some embodiments, for each target point measurement (e.g., for each transmitted pulse), the operations at blocks 510-540 may be performed before or during a portion of the transmission window, during which no transmitted pulse may be returned and received by the photodetector (e.g., photodetector 280 or 305) and thus the measured signal may only include noise and interference information. In some embodiments, the signal measured during the transmission window may include a portion of the transmitted pulse, which can be separated and used to determine the matched filter coefficients, and the remaining data may be used to extract the noise properties in the operation condition. In some embodiments, the operations at blocks 510-540 may not be performed for each target point or each transmitted pulse, but may instead be performed once for multiple measurements or multiple target points, or may be performed once during each predetermined time period (e.g., 10 μs, 100 μs, 1 ms, or longer). For each scanning direction (or target point), each transmitted pulse, or each pre-determined time period, the photodetector may measure the returned pulse and generate a detection signal that may include noise and interference data, and the digitized detection signal may be processed by the operations at block 550-570 to detect a peak of a pulse signal.

Using the processing depicted in FIGS. 5-8, the probability of false alarm can be maintained at or below the desired constant false alarm rate (e.g., $<1 \times 10^{-6}$) under various operation conditions (e.g., daytime, night, hot weather, cold weather, etc.) due to the real-time learning of the noise/interference properties (e.g., at block 520), the real-time matched filter updates (e.g., at block 530), and the real-time threshold computation (e.g., at block 540). In addition, the probability of detection may be maximized due to the usage of the improved matched filter.

The processing depicted in FIGS. 5-8 may be implemented in software (e.g., code, instructions, program) executed by one or more processing units (e.g., processors, cores) of the respective systems, hardware, or combinations thereof. For example, the operations in flow chart 500 may be performed by processor/controller 210 or receiver signal processing subsystem 310 described above. The software may be stored on a non-transitory storage medium (e.g., on a memory device). The processing presented in FIG. 5 and described above is intended to be illustrative and non-limiting. Although FIG. 5 depicts the various processing steps occurring in a particular sequence or order, this is not intended to be limiting. In certain alternative embodiments, the steps may be performed in some different orders or some steps may be performed in parallel. For example, in some embodiments, operations at block 540 may be performed after operations at blocks 550 and 560.

Figure 9:
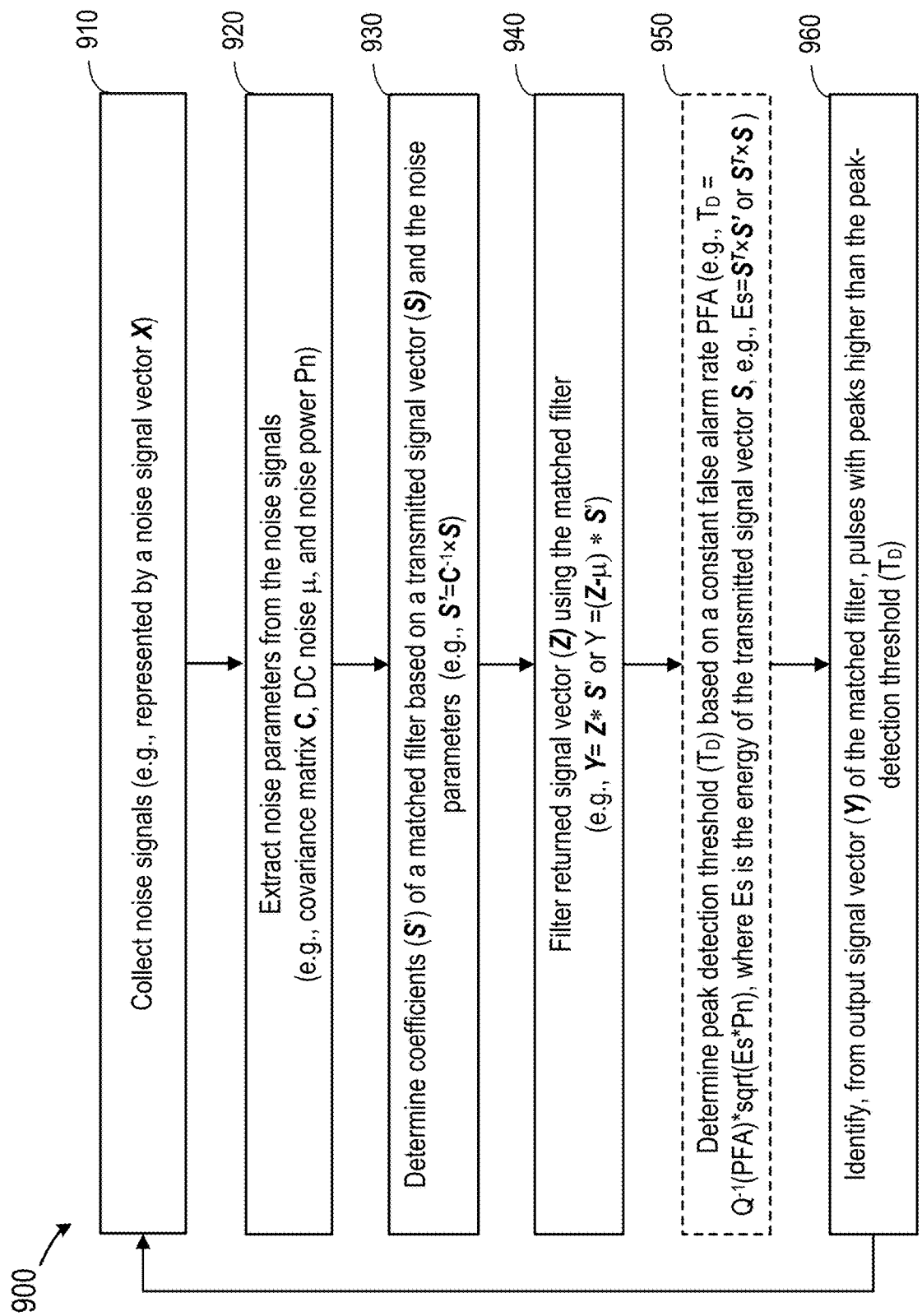
FIG. 9 is a flow chart illustrating an example of a process for detecting objects of interest using a LiDAR system according to certain embodiments.

FIG. 9 is a flow chart 900 illustrating an example of a process for detecting objects of interest using a LiDAR system according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different orders or some steps may be performed in parallel. An operation may have additional steps not included in the figure. Some operations may be optional, and thus may be omitted in various embodiments. Some operations described in one block may be performed together with operations described at another block. Some operations may be performed in different order. In some embodiments, the processing described in FIG. 9 may be performed by a receiver (or the receiver signal processing subsystem) of a LiDAR system described above. In some embodiments, the processing shown in FIG. 9 may be performed repeatedly to measure multiple points in the field of view of the LiDAR system.

At block 910, the receiver of the LiDAR system may collect noise signals in an operation condition of the LIDAR system. The noise signals may be collected by a photodetector of the receiver in a time window before a receive window (e.g., before or during a transmission window) of a measurement such that the noise signals would not include signals corresponding to light pulses reflected or scattered by objects in the field of view of the LiDAR system. In some embodiments where the noise signals are collected during the transmission window and a same photodetector is used to detected the transmitted pulses and the returned pulses, signals corresponding to the transmitted pulses may be removed from the detection signal of the photodetector to generate the noise signals. The noise signals may include noises caused by the LiDAR system, target objects, and the operation environment. In some embodiments, the noise signals may include interference signals in the operation environment. The noise signals may be processed by an analog front end of the receiver and converted to a noise signal vector X by an analog-to-digital converter.

At block 920, the receiver of the LiDAR system may extract noise parameters from the noise signals (e.g., the noise signal vector X), such as a covariance matrix C of the noise signal vector X, DC noise (i.e., bias) µ, and noise power Pn of the noise signals. In some embodiments, the dimension of the noise signal vector X may be greater than the order of a matched filter of the receiver, the noise signal vector X may be sampled (e.g., using a sliding window) to include a number of data points in each sub-vector $X_k$ that matches the order of the matched filter, and the covariance matrix may be determined for the sub-vector $X_k$.

At block 930, the receiver may determine the coefficients S' of the matched filter based on the transmitted signal vector S and the noise parameters (e.g., the covariance matrix C of the noise signal vector X). For example, the receiver may determine the coefficients of the matched filter by determining an inverse matrix $C^{-1}$ of the covariance matrix C, calculating a product of the inverse matrix $C^{-1}$ and the transmitted signal vector S, and assigning values in the product to the coefficients S' of the matched filter, such that $S'=C^{-1} \times S$. In some embodiments, the receiver may determine the coefficients of the matched filter by determining a whitening matrix based on the covariance matrix C, calculating a product of the whitening matrix and the transmitted signal vector S, and assigning values in the product to the coefficients S' of the matched filter.

At block 940, the receiver may filter a measured returned signal vector Z using matched filter coefficients S' by convolving matched filter coefficients S' and the returned signal vector according to, for example, Y=Z*S' or Y=(Z−µ)*S', where "*" corresponds to a convolution operation. The matched filter may be implemented as a discrete-time FIR filter. In some embodiments, the matched filter may be implemented using a set of registers or flip-flops, a set of multipliers, and one or more adders. Filtering (e.g., convolving) the returned signal vector Z using a matched filter determined based on the expected returned pulse may more accurately recover light pulses reflected or backscattered by objects in the field of view of the LiDAR system and determine the corresponding time of reception by the receiver for more accurate object detection and ranging. The matched filter may also suppress pulses that have a shape very different from the expected returned pulse, such as some spurious tones that may have a high amplitude but a short duration, thus reducing the false alarm rate.

At block 950, the receiver may determine a peak-detection threshold $T_D$ based on a desired constant false alarm rate PFA, the noise power Pn determined at block 920, and the transmitted signal power Es (e.g., Es=$S^T \times S'$ or $S^T \times S$). In one example, peak-detection threshold $T_D$ may be determined using equations (6) and (7).

At block 960, the receiver may identify, from output signal Y of the matched filter, pulses with peaks higher than the threshold $T_D$. Based on the identified pulses with peaks higher than the threshold $T_D$, the receiver may detect objects in the field of view of the LiDAR system. Thereafter, the receive may perform the operations at block 910 to start a new measurement. In some embodiments, based on a first time corresponding to a location of an identified pulse in the output signal Y of the matched filter and a second time when the corresponding light pulse is transmitted by the LiDAR system, the receiver may determine a distance between the LiDAR system and the detected object in the field of view of the LiDAR system.

Figure 10:
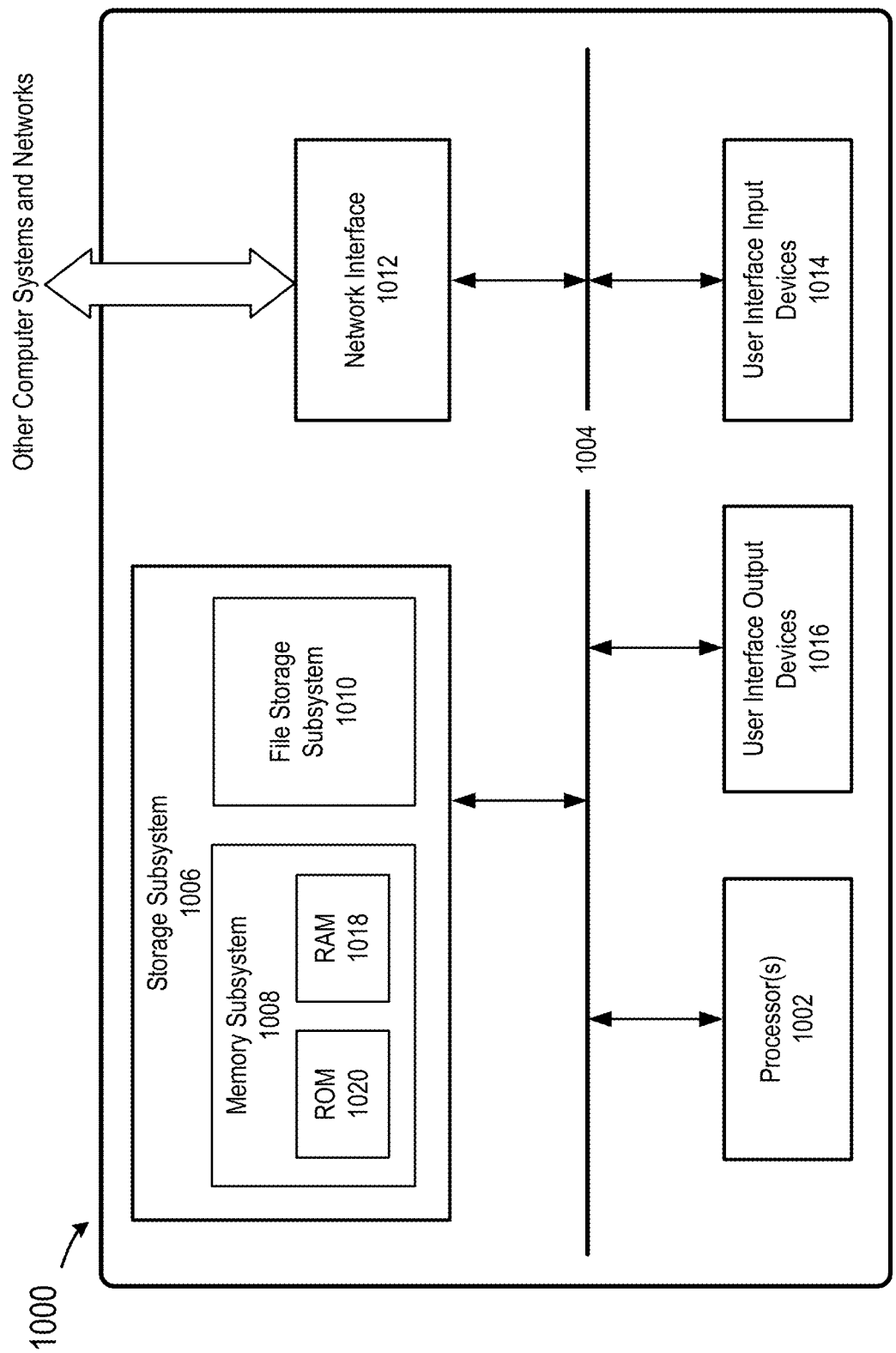
FIG. 10 is a simplified block diagram of an example of a computer system for implementing some techniques disclosed herein according to certain embodiments.

FIG. 10 illustrates an example computer system 1000 for implementing some of the embodiments disclosed herein. Computer system 1000 can be used to implement any of the systems and modules discussed above with respect to FIGS. 1-9. For example, computer system 1000 may be used to implement LiDAR system 102, processor/controller 210, receiver signal processing subsystem 310 or other systems, subsystems, units, or components described herein. Computer system 1000 can include one or more processors 1002 that can communicate with a number of peripheral devices (e.g., input devices) via a bus subsystem 1004. These peripheral devices can include storage subsystem 1006 (comprising memory subsystem 1008 and file storage subsystem 1010), user interface input devices 1014, user interface output devices 1016, and a network interface subsystem 1012.

In some examples, internal bus subsystem 1004 can provide a mechanism for letting the various components and subsystems of computer system 1000 communicate with each other as intended. Although internal bus subsystem 1004 is shown schematically as a single bus, alternative embodiments of the bus subsystem can utilize multiple buses. Additionally, network interface subsystem 1012 can serve as an interface for communicating data between computer system 1000 and other computer systems or networks. Embodiments of network interface subsystem 1012 can include wired interfaces (e.g., Ethernet, CAN, RS-232, RS-485, etc.) or wireless interfaces (e.g., ZigBee, Wi-Fi, cellular, etc.).

In some cases, user interface input devices 1014 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1000. Additionally, user interface output devices 1016 can include a display subsystem, a printer, or non-visual displays such as audio output devices, etc. The display subsystem can be any known type of display device. In general, use of the term "output device" is intended to include all possible types of devices and mechanisms for outputting information from computer system 1000.

Storage subsystem 1006 can include memory subsystem 1008 and file/disk storage subsystem 1010. Subsystems 1008 and 1010 represent non-transitory computer-readable storage media that can store program code and/or data that provide the functionality of embodiments of the present disclosure (e.g., software 101-204). In some embodiments, memory subsystem 1008 can include a number of memories including main random access memory (RAM) 1018 for storage of instructions and data during program execution and read-only memory (ROM) 1020 in which fixed instructions may be stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present disclosure. Many other configurations having more or fewer components than computer system 1000 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A light detection and ranging (LiDAR) system comprising:
    a transmitter configured to transmit light pulses to a field of view of the LiDAR system; and
    a receiver comprising a matched filter, the receiver configured to:
        generate, in an operation condition of the LiDAR system,
            a noise signal vector including noise data in the operation condition;
            a transmitted signal vector corresponding to a light pulse transmitted by the transmitter; and
            a returned signal vector corresponding to returned light received by the receiver;
        determine a covariance matrix of the noise signal vector;
        determine coefficients of the matched filter based on the transmitted signal vector and the covariance matrix of the noise signal vector;

filter, using the matched filter with the determined coefficients, the returned signal vector;
detect an object in the field of view of the LiDAR system based on identifying, in the returned signal vector filtered by the matched filter, a pulse having a peak higher than a threshold value;
determine a noise power of the noise data based on the noise signal vector;
determine a transmitted signal energy of the light pulse transmitted by the transmitter based on the transmitted signal vector; and
determine the threshold value based on a constant false alarm rate (CFAR), the noise power of the noise data, and the transmitted signal energy, wherein the receiver is configured to determine the threshold value by:
computing a square root of a product of the noise power of the noise data and the transmitted signal energy;
determining an inverse Q function of the CFAR; and
determining, as the threshold value, a product of the square root and the inverse Q function of the CFAR.

2. The LiDAR system of claim 1, wherein the receiver is further configured to:
determine, based on a first time corresponding to a location of the identified pulse in the returned signal vector and a second time when the light pulse is transmitted by the LiDAR system, a distance between the LiDAR system and the detected object.

3. The LiDAR system of claim 1, wherein the receiver is configured to determine the coefficients of the matched filter by:
determining an inverse matrix of the covariance matrix;
computing a product of the inverse matrix and the transmitted signal vector; and
assigning values in the product to the coefficients of the matched filter.

4. The LiDAR system of claim 1, wherein the receiver is configured to determine the coefficients of the matched filter by:
determining a whitening matrix based on the covariance matrix;
calculating a product of the whitening matrix and the transmitted signal vector; and
assigning values in the product to the coefficients of the matched filter.

5. The LiDAR system of claim 1, wherein the receiver is further configured to:
determine a bias of the noise data based on the noise signal vector; and
remove the bias from the returned signal vector,
wherein the receiver is configured to filter the returned signal vector by convolving the coefficients of the matched filter and the returned signal vector with the bias removed.

6. The LiDAR system of claim 1, wherein the receiver is configured to generate the noise signal vector in a time window before receiving the returned light.

7. The LiDAR system of claim 1, wherein the noise data includes interference data.

8. The LiDAR system of claim 1, wherein the matched filter includes a discrete-time finite impulse response filter.

9. A method comprising:
generating, by a receiver of a light detection and ranging (LiDAR) system under an operation condition,
a noise signal vector including noise data under the operation condition;
a transmitted signal vector corresponding to a light pulse transmitted by the LiDAR system to a field of view of the LiDAR system; and
a returned signal vector corresponding to returned light detected by the LiDAR system;
determining a covariance matrix of the noise signal vector;
determining coefficients of a matched filter based on the transmitted signal vector and the covariance matrix of the noise signal vector;
filtering the returned signal vector using the matched filter with the determined coefficients; and
detecting an object in the field of view of the LiDAR system based on identifying, in the returned signal vector filtered by the matched filter, a pulse having a peak higher than a threshold value;
determining a noise power of the noise data based on the noise signal vector;
determining a transmitted signal energy of the light pulse transmitted by the transmitter based on the transmitted signal vector; and
determining the threshold value based on a constant false alarm rate (CFAR), the noise power of the noise data, and the transmitted signal energy, wherein the receiver is configured to determine the threshold value by:
computing a square root of a product of the noise power of the noise data and the transmitted signal energy;
determining an inverse Q function of the CFAR; and
determining, as the threshold value, a product of the square root and the inverse Q function of the CFAR.

10. The method of claim 9, further comprising:
determining, based on a first time corresponding to a location of the identified pulse in the returned signal vector and a second time when the light pulse is transmitted by the LiDAR system, a distance between the LiDAR system and the detected object.

11. The method of claim 9, wherein determining the coefficients of the matched filter comprises:
determining a whitening matrix based on the covariance matrix;
calculating a product of the whitening matrix and the transmitted signal vector; and
assigning values in the product to the coefficients of the matched filter.

12. A receiver for a light detection and ranging (LiDAR) system, the receiver comprising:
a noise parameter extraction unit configured to:
receive a noise signal vector including noise data in an operation condition of the LiDAR system; and
determine a covariance matrix of the noise signal vector;
a matched filter configured to:
receive a returned signal vector corresponding to returned light received by the LiDAR system; and
filter the returned signal vector;
a matched filter coefficient determination unit configured to:
receive a transmitted signal vector corresponding to a light pulse transmitted by the LiDAR system; and
determine coefficients of the matched filter based on the transmitted signal vector and the covariance matrix of the noise signal vector; and
an object detection unit configured to detect an object in a field of view of the LiDAR system based on identifying, in the returned signal vector filtered by the matched filter, a pulse having a peak higher than a threshold value.

13. The receiver of claim 12, further comprising a threshold determination unit configured to:
  determine a noise power of the noise data based on the noise signal vector;
  determine a transmitted signal energy of the light pulse transmitted by the LiDAR system based on the transmitted signal vector; and
  determine the threshold value based on a constant false alarm rate (CFAR), the noise power of the noise data, and the transmitted signal energy.

14. The receiver of claim 13, wherein the threshold determination unit is configured to determine the threshold value by:
  computing a square root of a product of the noise power of the noise data and the transmitted signal energy;
  determining an inverse Q function of the CFAR; and
  determining, as the threshold value, a product of the square root and the inverse Q function of the CFAR.

15. The receiver of claim 12, wherein the matched filter coefficient determination unit is configured to determine the coefficients of the matched filter by:
  determining a whitening matrix based on the covariance matrix;
  calculating a product of the whitening matrix and the transmitted signal vector; and
  assigning values in the product to the coefficients of the matched filter.

16. The receiver of claim 12, wherein the object detection unit is further configured to:
  determine, based on a first time corresponding to a location of the identified pulse in the returned signal vector and a second time when the light pulse is transmitted by the LiDAR system, a distance between the LiDAR system and the detected object.

* * * * *